Oct. 28, 1924.
L. M. ALLEN
1,513,362
TELEPHONE EXCHANGE SYSTEM
Filed Sept. 22, 1921   11 Sheets-Sheet 1
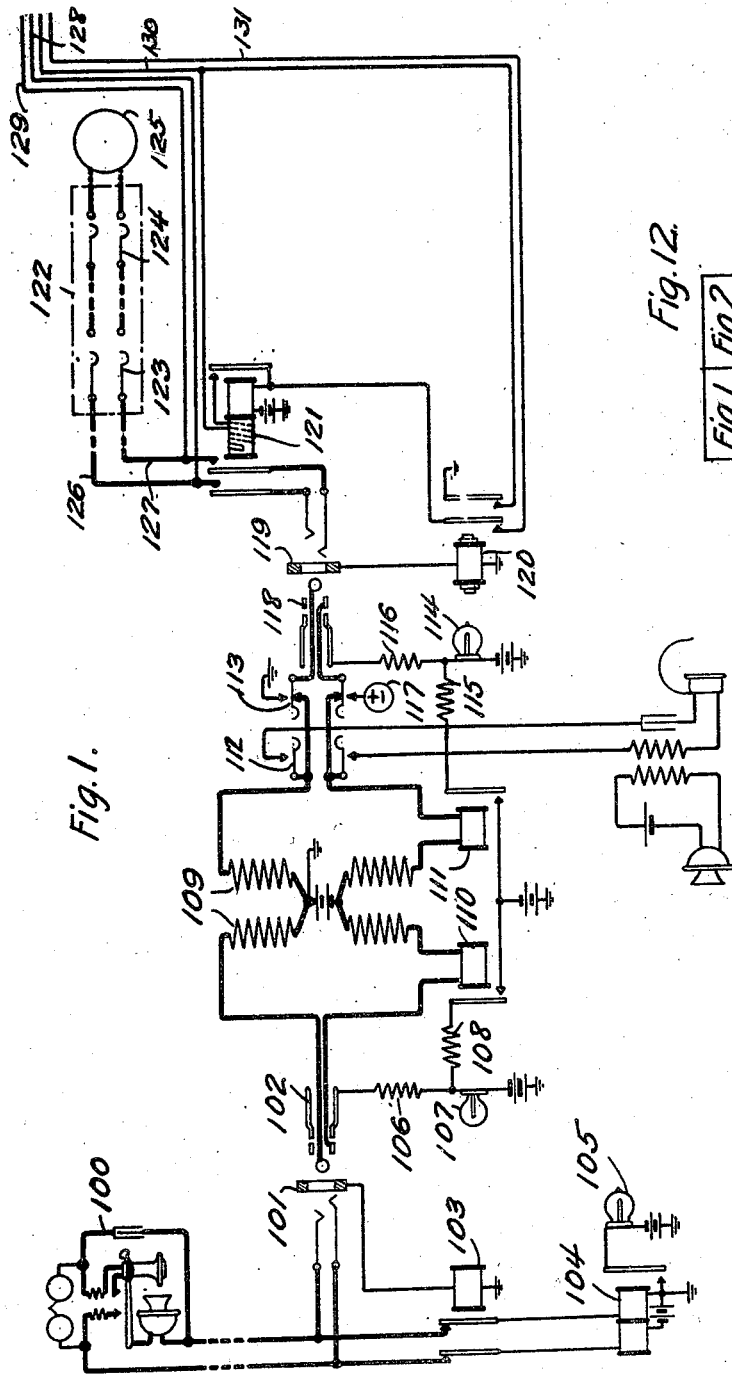
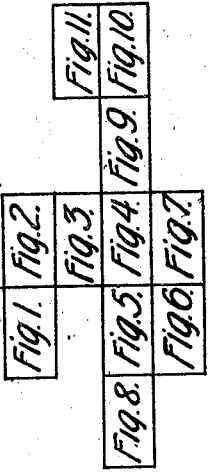
Inventor:
Louis M. Allen.

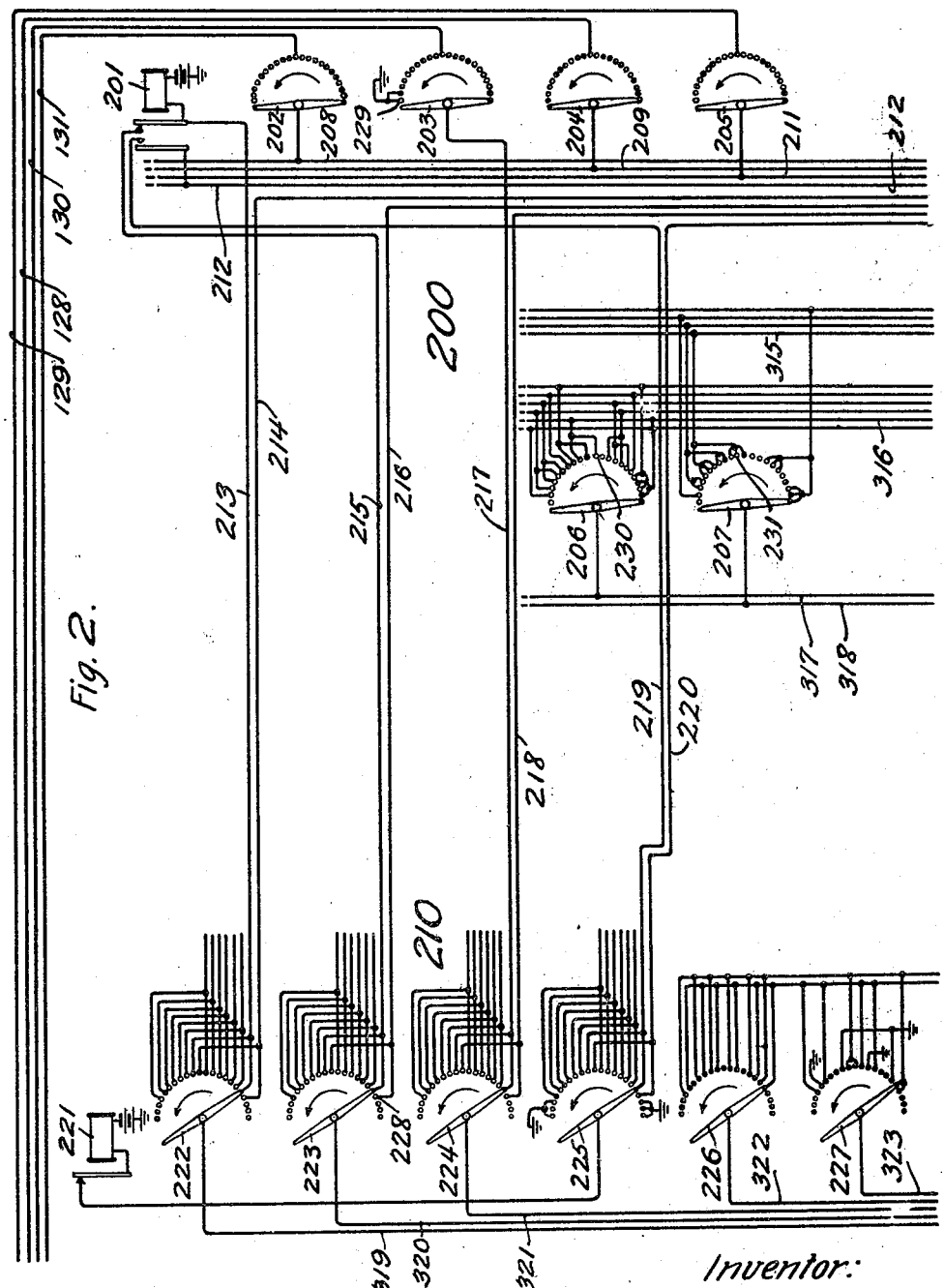

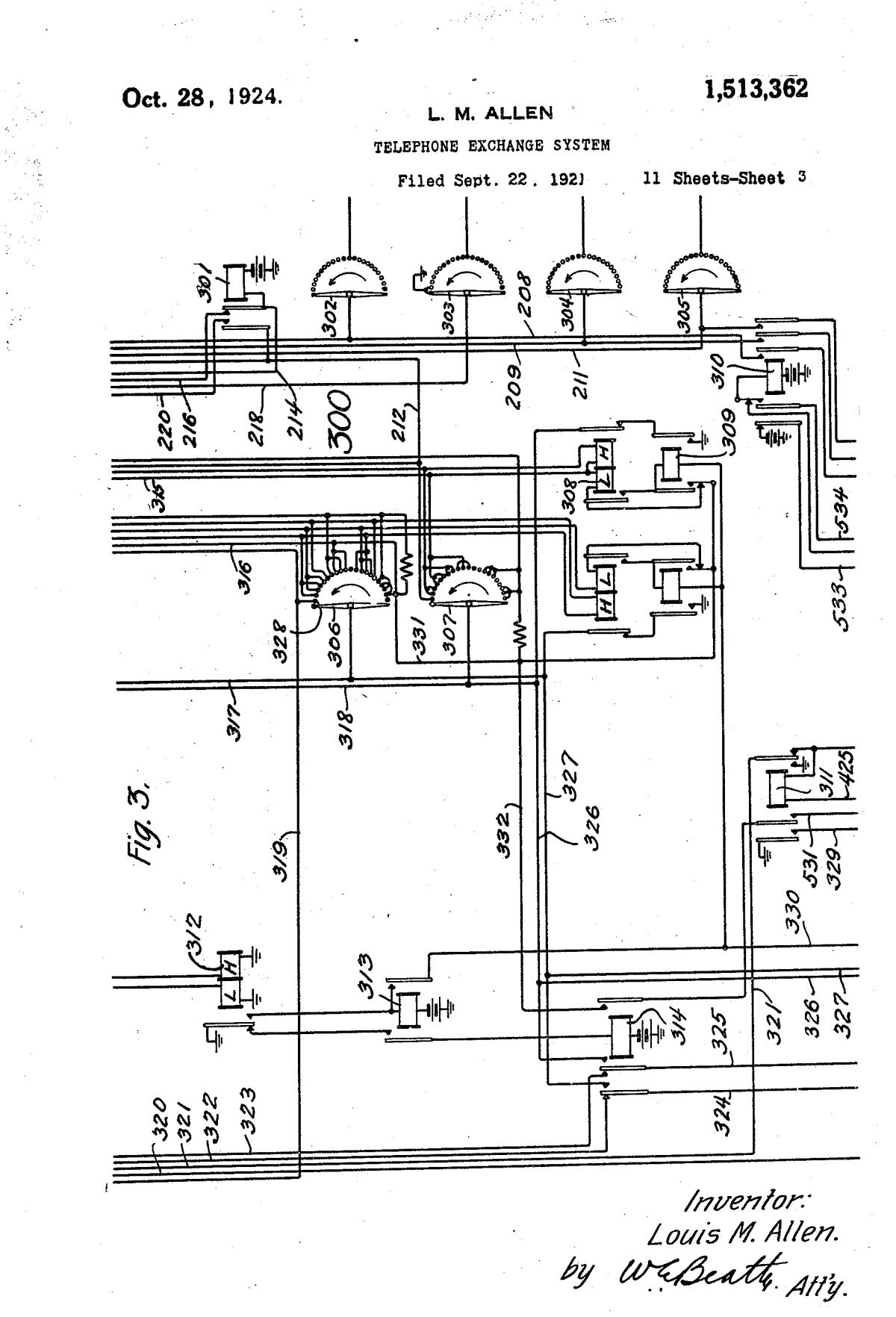

Oct. 28, 1924.

L. M. ALLEN 1,513,362

TELEPHONE EXCHANGE SYSTEM

Filed Sept. 22, 1921    11 Sheets-Sheet 3

Fig. 3.

Inventor:
Louis M. Allen.
by W. E. Beatty, Att'y.

Oct. 28, 1924.
L. M. ALLEN
TELEPHONE EXCHANGE SYSTEM
Filed Sept. 22, 1921   11 Sheets-Sheet 6
1,513,362

Inventor:
Louis M. Allen.
by Wm Beatty Atty.

Oct. 28, 1924.
L. M. ALLEN
1,513,362
TELEPHONE EXCHANGE SYSTEM
Filed Sept. 22, 1921    11 Sheets-Sheet 7
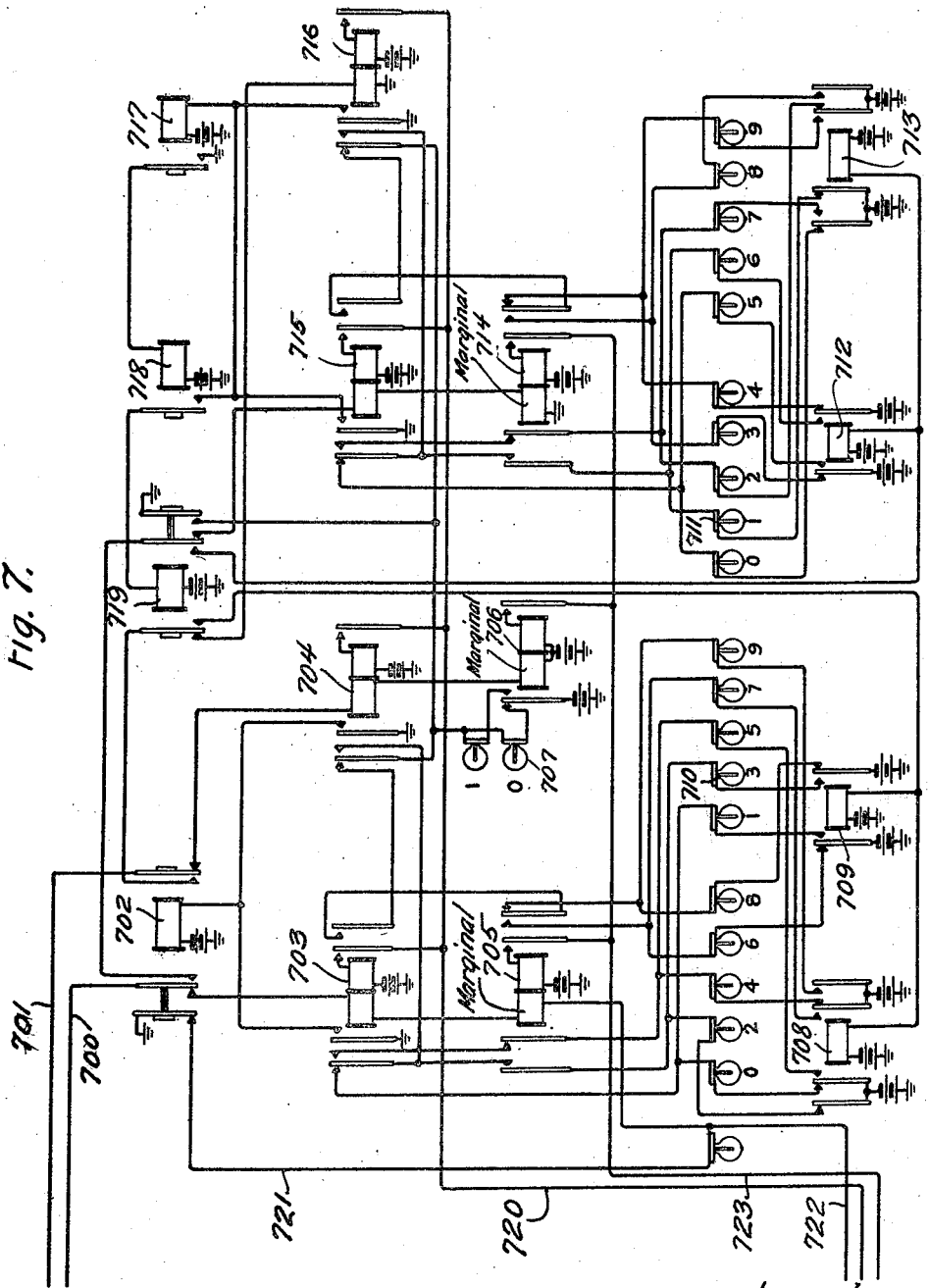
Inventor:
Louis M. Allen.
by W E Beatty, Att'y.

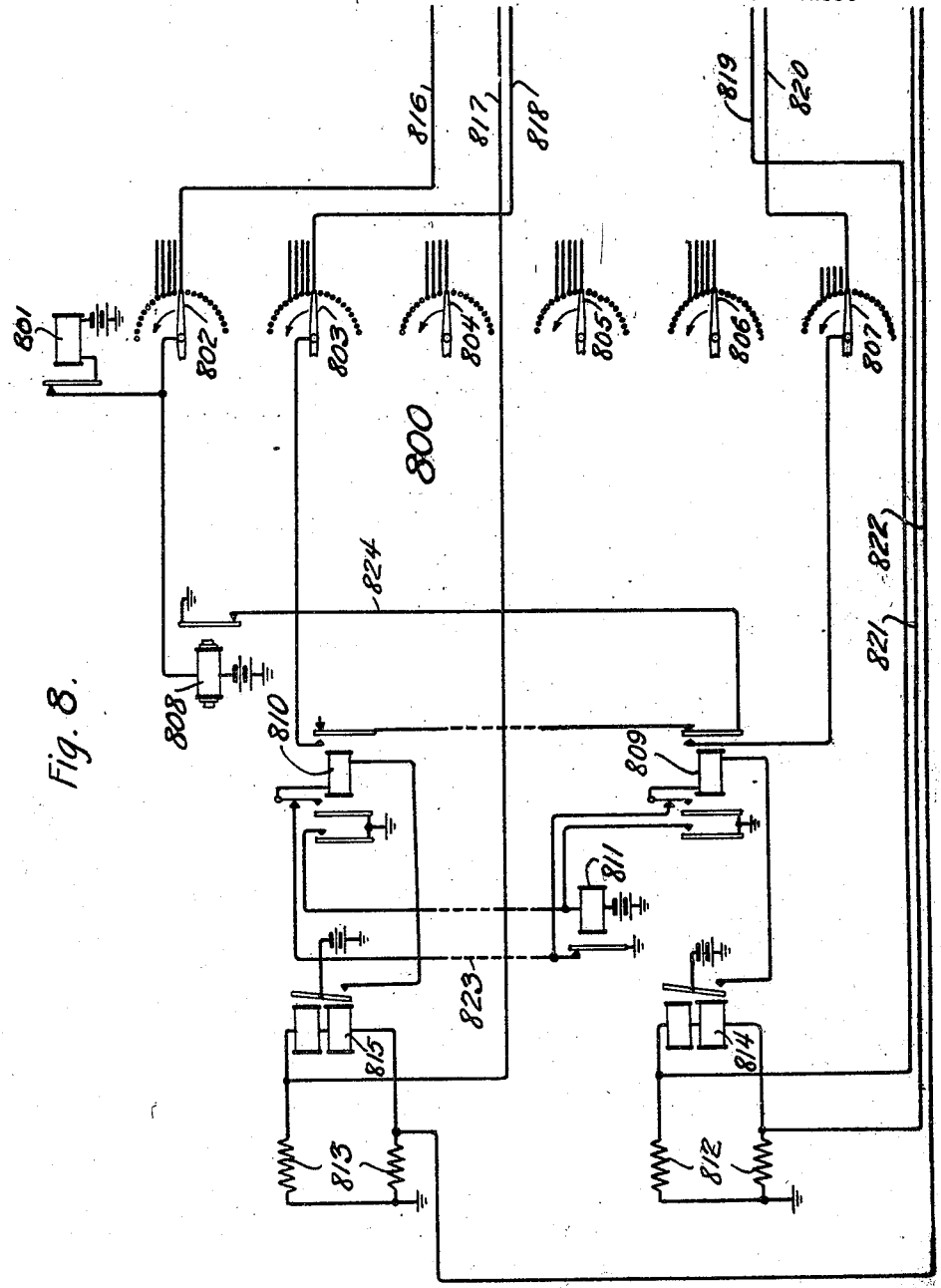

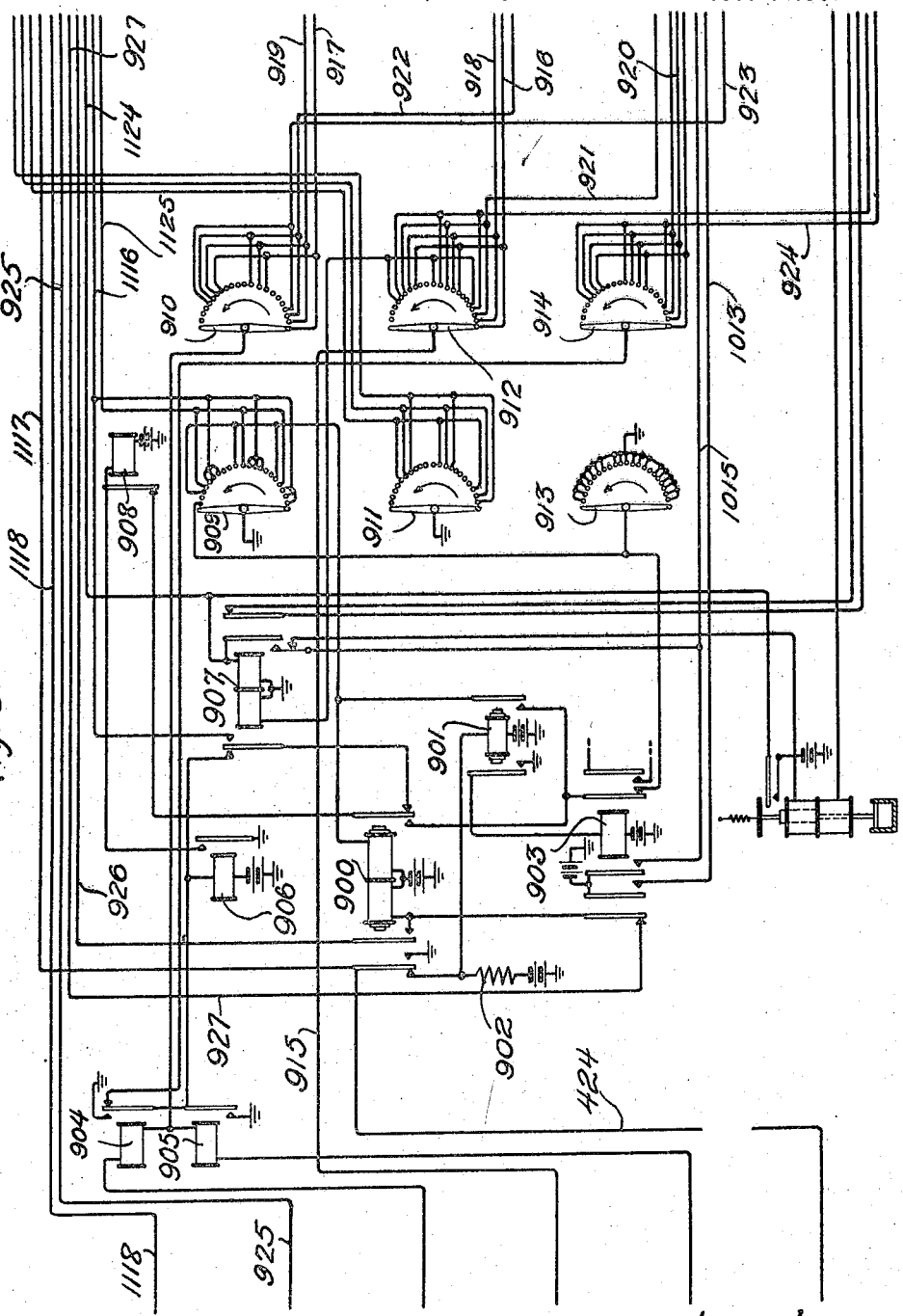

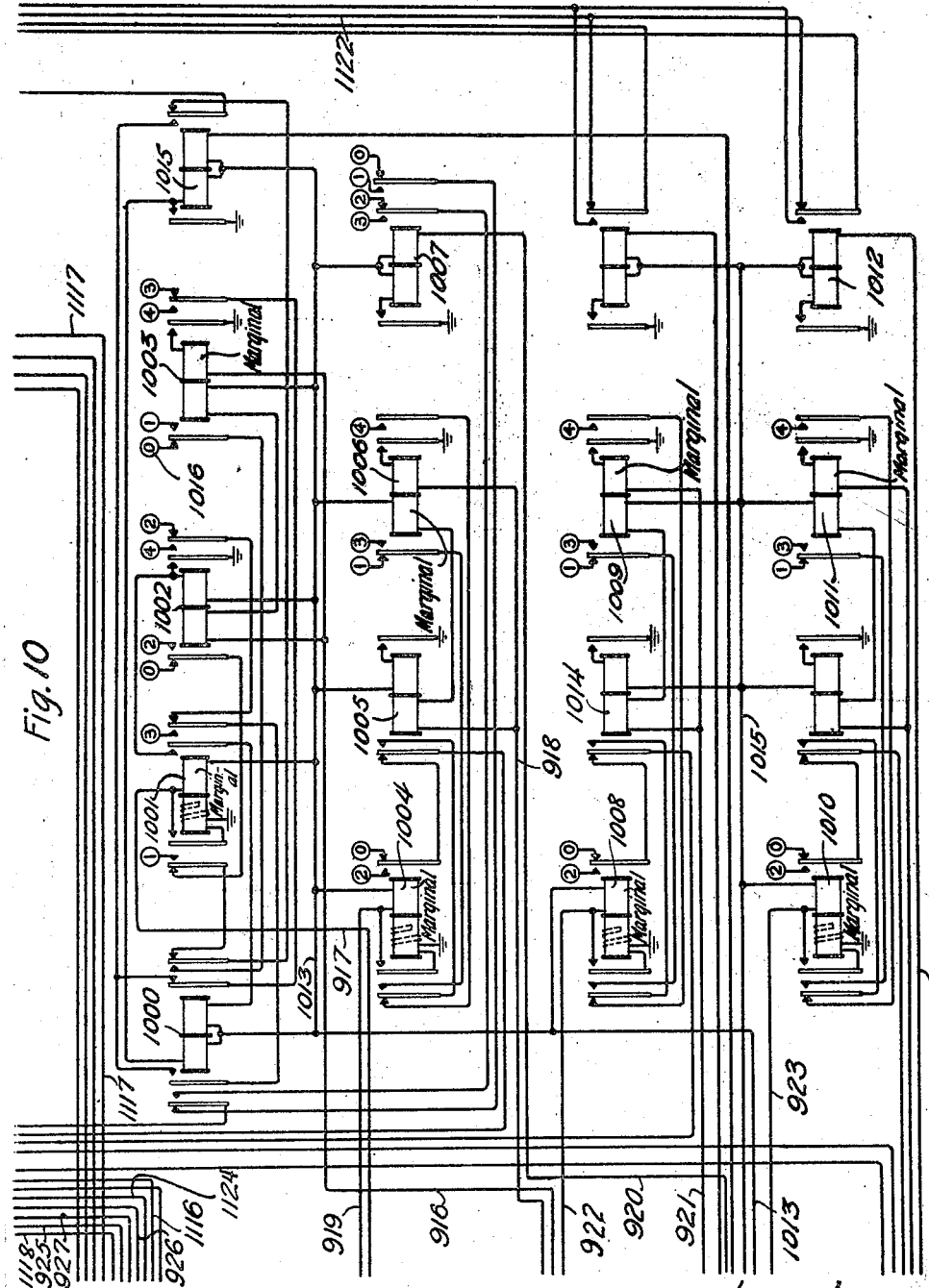

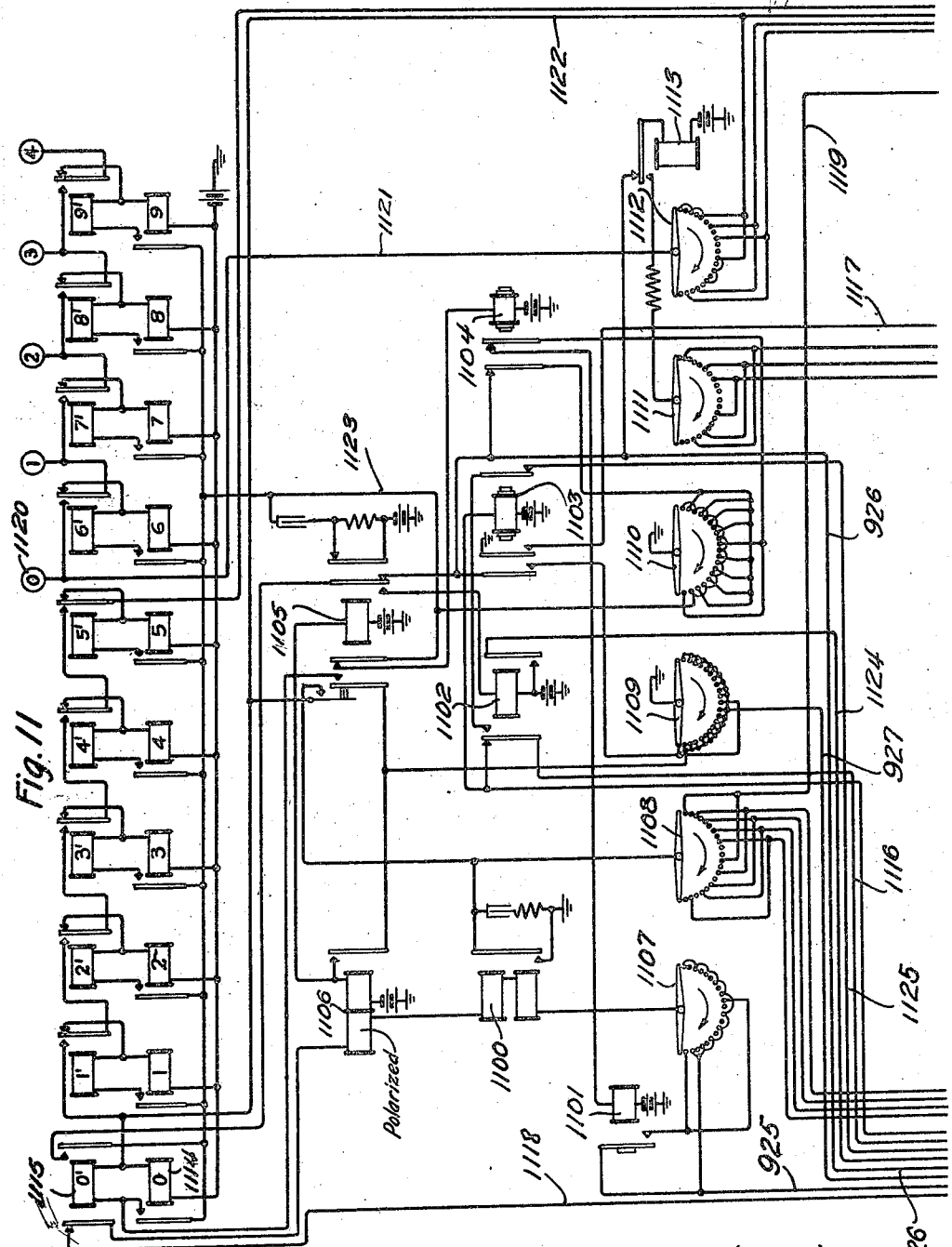

Patented Oct. 28, 1924.

1,513,362

UNITED STATES PATENT OFFICE.

LOUIS M. ALLEN, OF NEW YORK, N. Y., ASSIGNOR TO WESTERN ELECTRIC COMPANY, INCORPORATED, OF NEW YORK, N. Y., A CORPORATION OF NEW YORK.

TELEPHONE-EXCHANGE SYSTEM.

Application filed September 22, 1921. Serial No. 502,471.

*To all whom it may concern:*

Be it known that I, LOUIS M. ALLEN, a citizen of the United States, residing at New York, in the county of New York, State of New York, have invented certain new and useful Improvements in Telephone-Exchange Systems, of which the following is a full, clear, concise, and exact description.

This invention relates to telephone exchange systems and particularly to those systems wherein mechanical switching apparatus is employed in the establishment of talking connections.

In exchange areas including both manual offices and automatic offices, where provision is made for the extension of calls made in a manual office to any of the outlying automatic offices, it is found desirable in some cases to have the selective switches in the called automatic office controlled from mechanism located at the calling manual office. By this plan the operator who first answers the call is enabled to establish the interoffice connection which leads to a distant mechanical office without assistance, the entire operation of the switches at the distant office being governed by mechanism at the originating office controlled by the answering operator therein.

At the manual office there are provided a plurality of operators' positions each of which has access to a plurality of groups of outgoing trunks, one group leading to each of the distant mechanical offices served. Each position is further equipped with a sender controlling keyboard, a set of office keys and a set of indicating lamps for trunk identification. There is also located at the manual office a group of register senders, common to the use of all operators, and serving to control the movement of the switches in the distant offices. In order that an idle sender may be taken for use to extend a call, and to associate such sender with the keyboard at the operator's position concerned, and also with an idle trunk in the particular group leading to the called automatic office, a plurality of switching units is employed. These units comprise three distinct parts: a sender selector for selecting an idle sender, trunk selectors for choosing an idle outgoing trunk and a plurality of operators' position selectors. When one of the operators wishes to extend a call an allotted one of these switching units is set in motion, the three different types of switches comprising the unit all acting simultaneously.

Since the total number of operators in the manual office greatly exceeds the capacity of a switch of the kind desirable for use as a position selector the operators' positions are divided into a plurality of small groups. Accordingly, the position selecting mechanism of each switching unit consists of a corresponding number of separate position selector switches. Each of the position selectors serves its own separate group of positions, whereby any unit has access to any position in the office.

The object of the invention is, therefore, the provision, in a system of the character above outlined, of a switching mechanism including a plurality of position selectors with means for selectively operating said position selectors when the mechanism is taken for use.

A feature of the invention is the provision of means whereby, when a switching mechanism is taken for use by an operator in any of the several groups, only that particular one of the position selectors having access to the operator's position involved is set in operation to select such position.

Other and further features contemplated in the present invention will be made obvious from a consideration of the description given hereinafter and also from the appended claims.

Referring to the drawing, Figs. 1 to 11, when taken in the order shown in Fig. 12, disclose so much of a telephone system embodying the principles of this invention as is necessary to a comprehensive understanding thereof. Fig. 1 shows one of a plurality of answering operators' positions in a manual office provided with cord circuits for extending subscribers' lines over interoffice trunks outgoing to the distant mechanical offices. One of these outgoing trunks terminating in a distant mechanical office is also illustrated in this figure.

Figs. 2, 3, 4 and 5 show the switches which constitute one of a plurality of switching units. Figs. 2 and 3 illustrate two of a series of trunk selector switches for selecting idle trunks outgoing to a particular mechanical office. Fig. 4 shows a sender selector switch having access to a group of common register senders. Fig. 5 shows an operator's position selecting mechanism which consists of a plurality of separate position selector switches, two of these switches being shown in detail in the drawing.

To the right of the right-hand broken line in Fig. 6 there is shown an operator's position provided with office keys and a series of sender control keys. Between the two vertical broken lines another operator's position belonging to the same group of positions as the one shown at the right of the figure is also schematically illustrated. To the extreme left of this figure there is shown a third operator's position which is position No. 1 of the fifth group. Fig. 7 shows a set of indicating lamps located at the operator's position illustrated at the right in Fig. 6, the function of which is to give the operator a visual identification of the selected trunks at her position. Fig. 8 shows a starting and an allotting mechanism common to the entire group of switching units individual to the outgoing group of trunks to the mechanical office illustrated.

Figs. 9, 10 and 11 show one of a plurality of register senders located in the manual office and common to all operators' positions for controlling the selective movements of the switches in the distant mechanical offices. Fig. 9 shows a register control switch and its associated circuits. Fig. 10 shows a set of relay registers upon which the designations of called lines are recorded from the operator's position. Fig. 11 shows the sender consisting of a series of counting relays and a circuit changing switch.

While the invention has been disclosed herein in combination with an indicating device for indicating to the operator the number of the trunk selected and with specific mechanism comprising a plurality of trunk selector switches 200, 300, etc., and a steering switch for enabling the selection of an idle trunk in a large group of trunks, it is to be understood that applicant does not claim these features as a part of his invention but has disclosed them herein only for the purpose of more clearly illustrating the manner in which his invention is to be practiced. The trunk indicating device has been made the subject of a separate application, Serial No. 715,511, filed May 24, 1924 in the name of H. W. MacDougall and the trunk selecting mechanism has been made the subject of application, Serial No. 714,999 filed May 22, 1924 in the name of W. C. Weaver.

*General description of apparatus and operation.*

The selective switches 123 and 124, located in the distant mechanical office 122, are of the well-known power drive type such as that shown in the patent to Craft and Reynolds, No. 1,123,696, issued January 5, 1915.

The trunk selector switches 200 and 300, the sender selector 400, the position selectors 500 and 510, the allotter switch 800, the register control switch shown in Fig. 9, and the sender control switch shown in Fig. 11 are all of the rotary single motion step-by-step type driven by stepping magnets from terminal to terminal and so arranged that the brushes are moved forward to the next terminal upon deenergization of the stepping magnet.

In the system disclosed connections are established by the operators in the manual originating office to any of a plurality of distant mechanical offices. For each mechanical office to which the operators in the manual office have access there is provided a group of interconnecting trunk lines terminating at the mechanical office in machine switches. At the manual office these trunks are multipled so as to appear in jacks before each of the operators' positions. The operator responds to an incoming call in the usual manner and upon ascertaining the name of the called office and the number of the wanted line therein, she manipulates the necessary apparatus at her position which causes the automatic selection of an idle trunk outgoing to the called office, the association of an idle register sender with her position and with the selected trunk and the visual indication on indicator lamps of the identity of the selected trunk. She then sets up the number of the called line on a keyboard at her position and completes the connection by inserting the calling plug of her cord circuit into the jack of the indicated outgoing trunk. The manipulation of the operator's keyboard causes the desired designation to be registered upon the registers of the associated sender which thereafter serve to control the automatic switches in the distant mechanical office to further extend the outgoing selected trunk to the called subscriber's line.

As above noted, there is a group of outgoing trunks from the manual office to each of the distant mechanical offices served. Only one of these distant mechanical offices, the one illustrated at 122 in the drawing, and one of the trunks 126, 127 leading thereto have been shown herein. For the group of trunks leading to the office 122 there is provided in the manual office a plurality of switching units, only one of which is shown in Figs. 2, 3, 4 and 5. While these switching units are individual to a single group of trunks outgoing to a different mechanical office, they are common to all register senders and are also common to all operators' positions in the manual office. Each of these switching units comprises a series of trunk selector switches, two of which are shown at 300 and 200 respectively.

Assuming that the outgoing group of trunks to the office 122 is made up of 160 trunks, there will be provided in that case eight trunk selecting switches each having a capacity for twenty trunks. The switch 300 serves the first twenty trunks in the group, the switch 200 serves the second twenty trunks, and so on for the remaining six selector switches. The switch 300 comprises a stepping magnet 301 and a plurality of brushes 302, 303, 304, 305, 306, and 307 and their cooperating terminal banks. Similarly, the switch 200 consists of a stepping magnet 201 and brushes 202, 203, 204, 205, 206 and 207 and the corresponding terminal banks. The same is true of the succeeding selector switches not shown. The terminal banks with which the brushes 306 and 307 of the selector switch 300 cooperate, and the banks with which brushes 206 and 207 of switch 200 cooperate, and the corresponding banks of all succeeding switches in the series have their terminals multipled, as illustrated, for a purpose which will become obvious from the following description. Common to the entire series of trunk selector switches there is provided a steering or side switch 210 consisting of stepping magnet 221, brushes 222, 223, 224, 225, 226 and 227 and their cooperating terminal banks. The purpose of the side switch 210 is to determine the first one of the series of trunk selectors to be taken for use and to govern the circuit changes during the transition from one selector switch to the next. Provided all trunk selectors are in their normal positions when a switching unit is taken for use, the first one of the switches in the series, namely the switch 300 will be set in motion to hunt for an idle trunk in the first group of twenty. If all these trunks are busy the switch 300, having moved its brushes completely over their bank terminals, causes the advance of the side switch 210 to its next position where the second trunk selector in the series is then effective and operates to search for an idle trunk in the second group of twenty. This procedure continues until an idle trunk is finally found. The side switch 210 has no normal position but remains in the position corresponding to the trunk selector switch last taken for use so that when the unit is next operated that particular selector switch in the series is set in motion to search for an idle trunk instead of commencing again at the beginning of the series.

In addition to the trunk selector switches, the switching unit also consists of a sender selector switch 400 comprising a stepping magnet 401, brushes 402, 403, 404, 405, 406 and 407 and their corresponding terminal banks.

Lastly, the switching unit includes, together with the trunk selectors and the sender selectors, a plurality of operator's position selector switches, two of which are shown at 500 and 510. The switch 500 comprises a stepping magnet 507, brushes 501, 502, 503, 504, 505 and 506 and their corresponding terminal banks, while the switch 510 similarly consists of a stepping magnet 517 together with brushes 511, 512, 513, 514, 515 and 516. In order to secure a better understanding of the purpose for dividing the position selecting mechanism up into a plurality of selector switches each separate and distinct from the other, an explanation will first be given of the plan on which the operators' positions are grouped and divided.

Assume that the manual office has 100 operators' positions, which is a greater number than a single position selector switch of the usual type can serve with the requisite speed and efficiency. Accordingly, the total number of 100 operators' positions is divided into five different groups of twenty positions each, and each of the switching units is provided with five position selector switches each having a capacity for twenty operators' positions. The position selector 500, for example, serves the first group of twenty operators' positions in the office. The first and second of these positions in the first group of twenty are illustrated at 600 and 610. The next three succeeding position selector switches, which are not shown in the drawing, serve the next three groups of twenty operators' positions. Finally, the last or fifth position selector switch 510 serves the fifth group of twenty operators' positions, the first position of which is schematically shown at 620 of Fig. 6. The function of the position selector switch 500 of the switching unit shown is to associate any one of the twenty positions with the register sender selected by the switch 400 of the same unit and to associate the trunk indicating mechanism in Fig. 7 at the operator's position with the controlling devices pertaining to the trunk selecting switches of the same unit, and which are shown in Fig. 3. Likewise, this is the function of the remaining four position selector switches of this switching unit with respect to the succeeding four groups of twenty operators' positions.

Since there are a plurality of switching units individual to each outgoing group of trunks, there are, not shown, a number of switching units equivalent and identical to the one shown in Figs. 2, 3, 4 and 5. The trunk selector switches, similar to 300 and 200 of each of these remaining units, have access to the same outgoing trunks; the sender selectors, similar to switch 400, have access to the same common senders and the position selector switches 500, 510, etc. all have access to the same corresponding groups of operators' positions. Where these switching units are all equivalent to one another and may be taken for use by any one of the operators in the exchange, an allotting device is employed for allotting an idle switching unit for the use of any operator and for preventing more than one switching unit being taken for use at the same time. The allotter for this purpose is shown in the form of the switch 800 in Fig. 8. Switch 800 consists of a stepping magnet 801, brushes 802, 803, 804, 805, 806 and 807 and their corresponding terminal banks. The brush 807 and its terminal bank pertain to the first position selector switch 500 of each of the several equivalent switching units. The brush 803 and its terminal bank pertain to the fifth or last position selector switch 510 of each of the switching units. Similarly, the intermediate brushes 806, 805 and 804 pertain, respectively, to the three intermediate position selectors of each switching unit belonging to the outgoing group of trunks leading to the mechanical office 122.

The balancing coil 812, together with the polarized relay 814, acts to initiate the operation of the allotted switching unit under the control of any operator in the first group of operators. The balancing coil 813 and polarized relay 815 act to initiate the movement of the allotted switching unit under the control of any operator in the last or fifth group of operators. Likewise, three intermediate balancing coils are provided, not shown, and serve, respectively, to start the allotted switching units under the control of operators in the three respective intermediate groups. The five balancing coils are individual, respectively, to the five position selector switches of each switching unit. For example, the coil 812 is individual to the position selector 500 having access to the first group of twenty operators' positions. The coil 813 is individual to the fifth position selector switch 510 having access to the fifth group of twenty operators' positions. The same is true of the remaining balancing coils and position selector switches.

The register sender, shown in Figs. 9, 10 and 11, is the usual type used in central offices for governing the selective movement of revertive control power driven switches, such as those illustrated at 123 and 124. The basic principle of a set of counting relays, which are successively energized under the control of impulses reverted from the switch over the fundamental circuit, the number of counting relays operated being dependent upon the designation recorded on the registers to determine the extent of motion of the switch, is employed in the sender shown in this system and the description to be given in connection with the operation hereinafter is thought to be sufficient.

Each of the several operators' positions is equipped with a plurality of keys individual to the different outlying mechanical offices to which connections may be extended from the manual office. The keys 601, 621 and 627 at each of the three positions shown in the drawing are individual to the mechanical office 122. The manipulation of one of these keys by the operator at the corresponding position initiates the movement of the allotted switching unit individual to the group of trunks outgoing to the office 122. For every other mechanical office, similar to the office 122, served through the manual office illustrated in this disclosure, there will be at each operator's position an office key similar to those shown. The actuation of these keys will, in a similar manner, cause the movement of an allotted switching unit, similar too the one shown in Figs. 2, 3, 4 and 5, but individual to the particular distant mechanical office represented by the key depressed.

*Detailed description of operation.*

Figure 4:
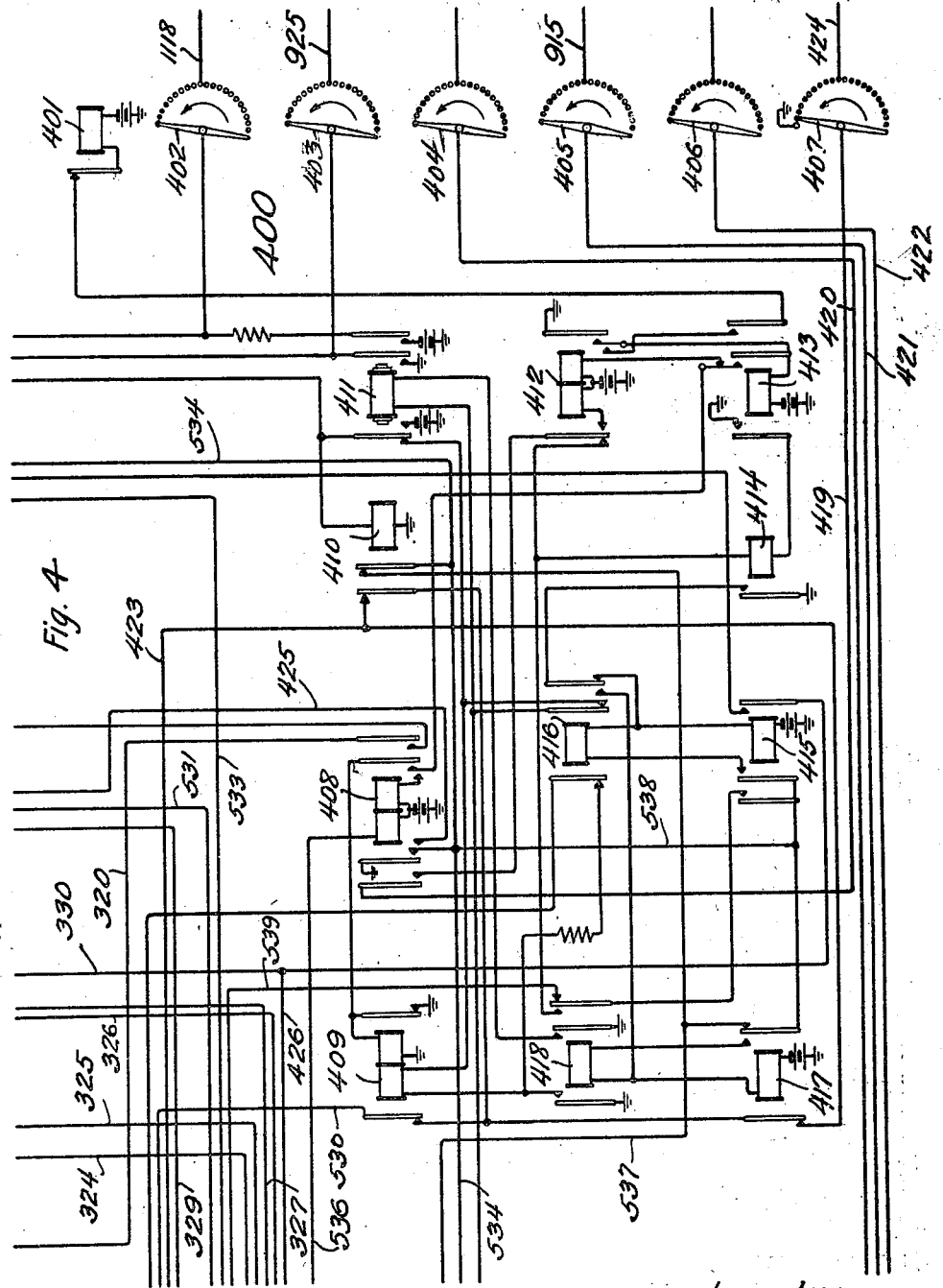
Figure 5:
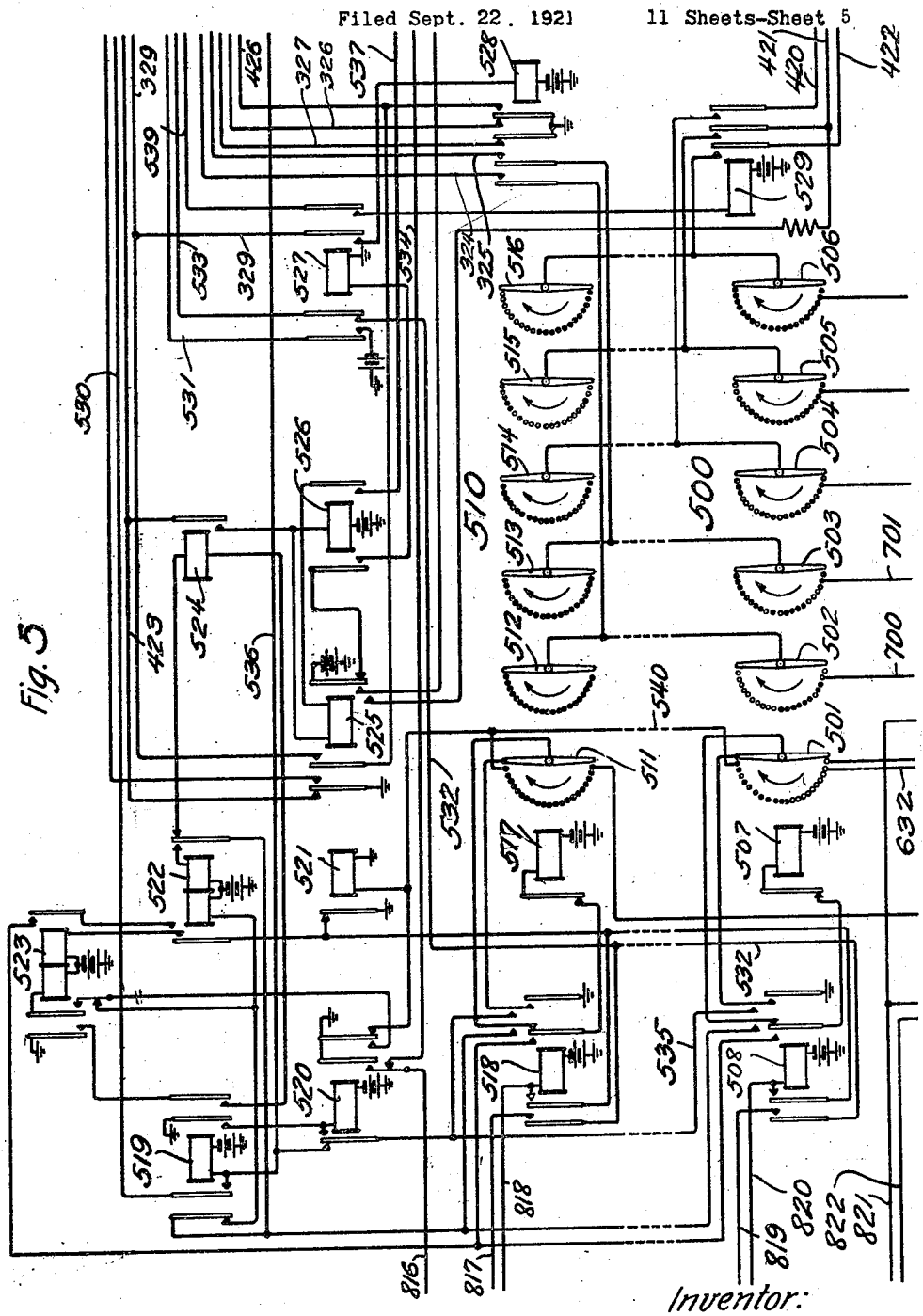

A general description having thus been given of the system and its purposes, a detailed explanation will now be made with respect to the establishment of a telephone connection. To this end it may be assumed that the subscriber of line 100 in the manual office wishes to converse with the subscriber of line 125 in the distant mechanical office 122. Upon removing his receiver from the switch hook the calling subscriber completes a circuit for the energization of line relay 104, which, in turn, causes the illumination of lamp 105. It will be considered that the line 100 terminates in jack 101 before the second operator in the first group of twenty operators. This operator, on observing the illumination of lamp 105, answers by inserting the plug 102 of her cord circuit in the jack 101. The insertion of the plug in the jack completes a circuit from battery through the lamp 107, resistance 106, sleeve of plug 102, sleeve of jack 101, winding of relay 103 to ground. Relay 103 operates and severs the circuit of relay 104 which causes the deenergization of the line lamp 105. The receiver being off the switch hook, the insertion of the plug in the jack also completes a circuit from battery through the lower left-hand winding of repeating coil 109, winding of relay 110, ring of plug 102, ring of jack 101, over the loop of the line, returning through the tip of jack 101, tip of plug 102, upper left-hand winding of repeating coil 109 to ground. Relay 110 operates in this circuit and closes a circuit from battery through its contact and armature, resistance 108, resistance 106, thence over the path previously traced through the winding of relay 103 to ground. This latter circuit shunts the supervisory lamp 107 causing the same to remain extinguished.

Figure 6:
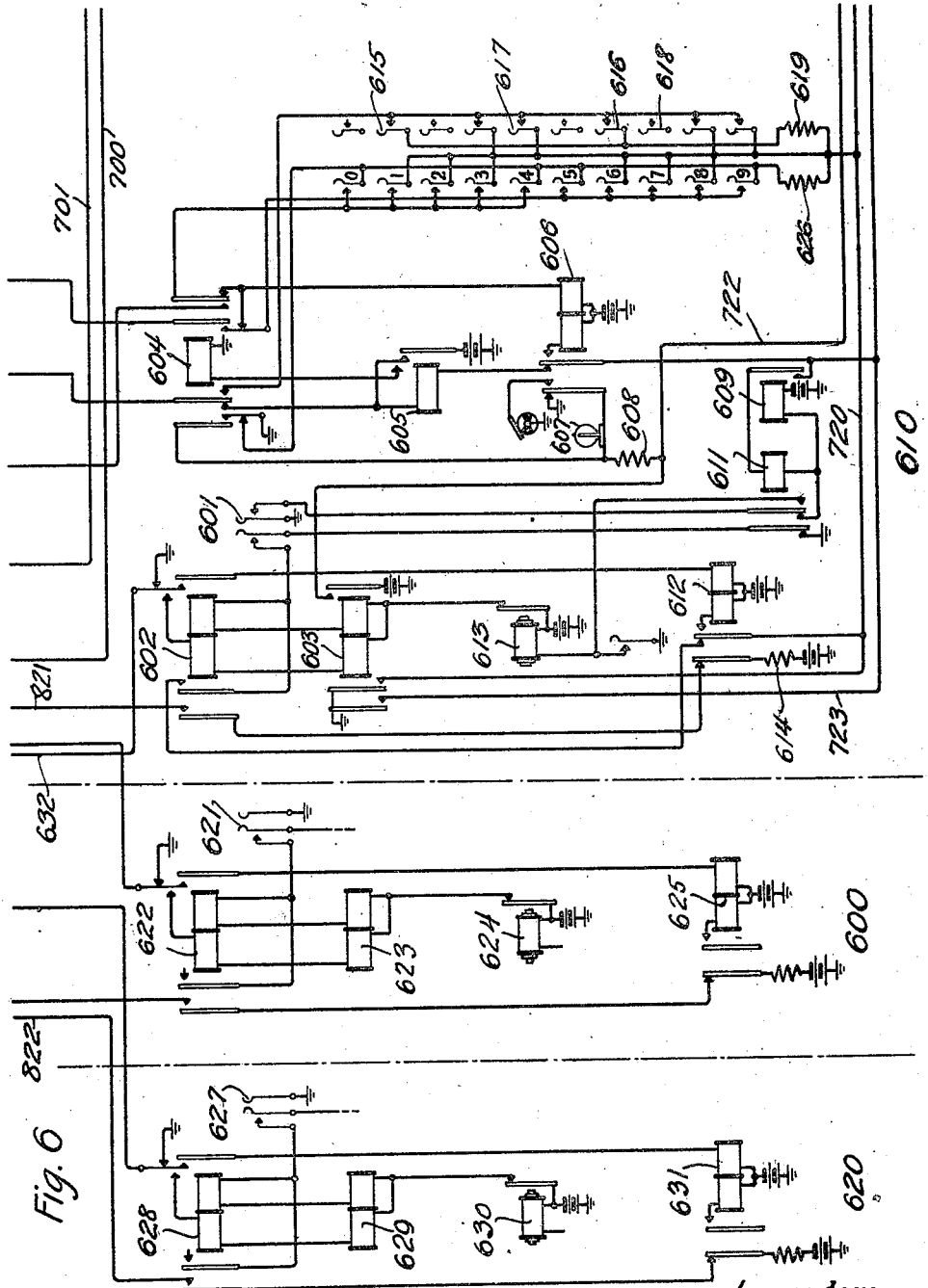

The operator next depresses the listening key 112 connecting her head set in conversational relation with the calling line and ascertains the desires of the calling subscriber. Upon learning that he wishes to talk with a subscriber in a distant mechanical office 122, the operator, whose position is shown at 610 in Fig. 6 of the drawing, actuates the office key 601 which bears the name of the office 122. The depression of key 601 completes a circuit from ground through the outer back contact of relay 611, left-hand contact of key 601, right-hand winding of relay 602, right-hand winding of relay 603, contact of relay 613 to battery. Relays 602 and 603 operate in this circuit and close a holding circuit for themselves as follows: battery, through the contact of relay 613, right-hand windings of relays 603 and 602, inner left contact of relay 602, inner back contact of relay 612, inner front contact of relay 603 to ground. The depression of key 601 also closes a circuit from battery through the winding of relay 609, inner back contact of relay 611, right-hand contact of key 601 to ground. Relay 609 operates and closes a circuit from battery through its winding and the winding of relay 611 in series, front contact of relay 609, outer left contact of relay 603 to ground. Relay 611, which is shunted as long as key 601 is held actuated, operates in series with relay 609 over the circuit just traced at the instant the operator releases the key 601. The operation of relay 603 closes a circuit from battery through the right contact of said relay, resistance 608, lamp 607, outer left back contact of relay 606 to ground. The lamp 607 illuminates and remains lighted under the observance of the operator until an idle register sender has become associated with her position.

Immediately that relay 602 is energized a circuit is closed from battery through resistance 614, outer contact of relay 612, outer left contact of relay 602, conductor 821, thence to a point between the lower winding of the balancing coil 812 and the polarized relay 814. The flow of current to ground through the coil 812 and through the winding of the polarized relay 814 is in such a direction as to cause said relay to attract its armature. Relay 814 closes a circuit from battery through its contact, winding of relay 809, normal contacts of said relay, contact of relay 811 to ground. Relay 809 operates and closes a locking circuit for itself through its inner left contact to ground. Relay 809, at its outer left contact, closes an energizing circuit for relay 811. Relay 811 attracts its armature and removes ground from conductor 823 thereby preventing the operation of another relay similar to relays 809 and 810 until the allotted switching unit has been started and another one allotted in its stead. Relay 809, on operating, closes a circuit from ground through the contact of relay 808, right front contact of relay 809, brush 807, conductor 820, leading to the switching unit which is allotted by the allotter switch 800 when standing in the position shown, winding of relay 508 to battery. Relay 508 operates and closes a locking circuit for itself from battery through its winding and inner left contact to ground at the contact of relay 521. Relay 508 completes a circuit from ground through its outer right front contacts, conductor 535, left back contact of relay 520, and thence in parallel through the winding of relay 519 to battery and over conductor 536 through the left-hand winding of relay 408 to battery. Relay 519 operates and locks in a circuit from battery through its winding and inner left contact, conductor 530, left contact of relay 409, outer left contact of relay 410, conductor 423, outer left back contact of relay 525 to ground. Relay 408 also energizes and locks in a circuit from battery through its right-hand winding and inner right front contacts to ground through the right-hand contact of relay 409.

Relay 519 closes a circuit from battery through the winding of relay 520, inner right contact of relay 519 to ground. Relay 520 operates and locks in a circuit from battery through its winding and inner left contact, conductor 535 to ground at the outer right contact of relay 508. Relay 520 at this time applies a ground potential to the conductor 816 which serves to render the switching unit busy to the allotter switch 800 and also initiates the movement of the allotter to select and allot the next idle switching unit for use. The operation of the allotter will be considered at a later point in the description. Relay 520 also closes a circuit from battery through the left-hand winding of relay 522, normal contacts at the inner left-hand armature of relay 523, outer right front contact of relay 520 to ground. Relay 522 becomes energized and locks in a circuit from battery through its right-hand winding and right-hand front contact, front contacts of the inner right-hand armature of relay 508, brush 501 and its normal position terminal, outer right front contact of relay 508 to ground. Relay 522 also closes a circuit from battery through the right-hand winding of relay 523, left-hand contact of relay 522, contact of relay 521 to ground. Relay 523 operates and locks in a circuit from battery through its left-hand winding and outer right front contact of relay 520 to ground. With relays 522 and 523 operated a circuit is closed for the stepping magnet 507 of the position selecting switch 500, which has access to the first group of twenty operators' positions containing position No. 2, shown at 610, at which the depression of key 601 has initiated the movement of the switching unit. The circuit for the magnet 507 may be traced from battery through the winding and contact of said magnet, inner right front contact of relay 508, right contact of relay 523, left front contacts of relay 522, contact of relay 521 to ground. Magnet 507 interrupts its own circuit and advances the brushes 501, 502, 503, 504, 505 and 506 from position to position in the direction indicated by the arrows. The test brush 501 tests the condition of the successive operators' positions. The terminals with which brush 501 cooperates, representing non-calling positions, will present a ground potential to the brush 501. This ground potential serves to maintain the holding circuit of relay 522, above traced, closed. When, however, the brush 501 reaches the second position terminal, representing the second operator's position 610, no ground potential will be found thereon due to the energized condition of relay 602. Hence, the circuit of relay 522 is opened and this relay becomes deenergized, opening, in turn, the operating circuit of the stepping magnet 507 whereby the switch 500 comes to rest. Immediately that relay 522 releases its armatures a circuit is closed from battery through the right-hand winding of relay 612, right front contact of relay 602, conductor 632, brush 501, front contacts of the inner right-hand armature of relay 508, right back contact of relay 522, winding of relay 524, outer right contact of relay 519, outer left contact of relay 523 to ground. Relays 612 and 524 become energized. Relay 612 closes a holding circuit for itself from battery through its left-hand winding and inner left front contact to ground at the inner left contact of relay 603. Relay 612 also opens the previously traced locking circuit of relays 602 and 603 but these relays remain energized in a substitute locking circuit traceable from battery through the contact of relay 613, left-hand windings of relays 603 and 602 in series, front contacts at the right-hand armature of relay 602, conductor 632, and thence to ground through the winding of relay 524, as above traced. Relay 612, at its outer left contact, disconnects battery from the conductor 821 and the balancing coil 812.

Relay 524, which energizes in series with relay 612, completes a circuit from battery through the winding of relay 526, contact of relay 524, outer left back contact of relay 525 to ground. Relay 526 operates and closes a circuit from battery through its winding and the winding of relay 525, right contact of relay 526, conductor 537, inner contact of relay 410, inner left contact of relay 408 to ground. Relay 525, however, cannot operate in this circuit since it is shunted by the direct circuit traced from battery through the winding of relay 526 and the contact of relay 524 to ground. With relay 526 operated a circuit is established from battery through the right back contact of relay 525, left contact of relay 526, winding of relay 527 to ground. The operation of relay 527 serves as an indication that the operator's position has been found.

The selected operator's position is maintained non-selectable to other position switches by the application of ground potential to the test terminals of all switches, similar to 500, with which the brushes 501 cooperate. It will be understood, of course, that the terminals of the position selector switches are multipled to the terminals in corresponding switches of other units. The circuit for the application of this ground potential to the mutiple test terminals of selector 500 and its corresponding selectors in other switching units may be traced from ground through the outer left contact of relay 523, outer right contact of relay 519, winding of relay 524, right back contact of relay 522, front contacts at the inner right armature of relay 508, brush 501, and thence to the multiple terminals representing the operator's position selected. The resistance of relay 524 is comparatively low so that the potential on the test terminals acts to render the position non-selectable to other switches.

The relay 408, which energizes at the time the office key 601 is depressed, serves to initiate the movement of the sender selector switch 400 to select an idle register sender. Upon the operation of relay 408 a circuit is closed from battery through the right-hand winding of relay 412, normal contacts at the inner right armature of relay 413, inner right front contact of relay 408, right contact of relay 409 to ground. Relay 412 energizes and closes a locking circuit for itself as follows provided the register sender, upon the terminals of which the brushes of the selector 400 are now standing, is busy: battery, through the left-hand winding and left front contact of relay 412, outer left contact of relay 408, conductor 419, test brush 407, test terminal of the busy sender, and thence to ground. Relay 412, on remaining energized, closes a circuit from battery through the winding of relay 413, right contact of relay 412 to ground. Relay 413 operates and closes a circuit for itself from battery through its winding and inner right contact, inner right contact of relay 408 to ground at the right contact of relay 409. Relay 413 opens the energizing circuit through the right-hand winding of relay 412 whereby this latter relay is now dependent for its continued energization upon the test circuit through its left-hand winding and the test brush 407. With relays 412 and 413 both energized a circuit is established from battery through the winding and contact of the stepping magnet 401, outer right contact of relay 413, right front contact of relay 412 to ground. Magnet 401 operates to advance the brushes of the switch 400 forward to their next position terminals. The magnet 401 interrupts its own circuit and continues to advance the brushes of the sender selector switch until the test brush 407 encounters a non-grounded terminal identifying an idle register sender.

At the instant an idle sender is reached the holding circuit of relay 412 is opened and this relay becomes deenergized to open the stepping circuit of magnet 401. Relay 413, however, remains energized. When relay 412 becomes deenergized a circuit is closed from ground through the left contact of relay 413, winding of relay 414, left back contact of relay 412, outer left contact of relay 408, conductor 419, test brush 407, conductor 424, outer left back contact of relay 900, thence in parallel through the resistance 902 and the winding of relay 901 to battery. Relay 414 operates in this circuit and establishes a circuit from battery through the winding of relay 415, outer right back contact of relay 416, contact of relay 414 to ground. Relay 415 operates and closes a circuit from battery through its winding and the winding of relay 416 in series, inner left contact of relay 415, conductor 538, inner left contact of relay 408 to ground. Relay 416, however, cannot operate at this time since its winding is shunted out by the direct path to ground at the contact of relay 414. Relay 901, which also operates in series with relay 414, closes an obvious circuit for relay 903.

The relay 415, which operates at the time the switch 400 selects an idle sender, serves in conjunction with the relay 527, which is operated at this time provided the operator's position has been selected, to complete a circuit for the connecting relay 529. This circuit may be traced from battery through the winding of relay 529, outer right contact of relay 527, conductor 539, outer right back contact of relay 418, outer left contact of relay 415, conductor 538, inner left contact of relay 408 to ground. Relay 529, at its armatures and contacts, extends the three conductors 420, 421 and 422 from the selected register sender through the brushes 504, 505 and 506 to the operator's keyboard whereby the manipulation of these keys will serve to record the designation of the called line on the registers of the sender. At the time the sender is selected a circuit is closed from ground through the outer left contact of relay 603, inner left back contact of relay 606, winding of relay 605, inner left back contact of relay 604, brush 505, middle contact of relay 529, conductor 421, brush 405, conductor 915, brush 912 of the control switch and its normal position terminal, conductor 916, left-hand winding of relay 1002, left-hand winding of relay 1003, conductor 1013, middle left contact of relay 903 to battery. Relay 605 operates in this circuit but its resistance is so high that the relays 1002 and 1003 do not receive sufficient current to become energized. Relay 605 closes a holding circuit for itself from battery through its contact and winding, and thence to ground, as traced, at the outer left contact of relay 603. Relay 605, at its front contact, also closes an obvious circuit for relay 604. Relay 604 connects the operator's keyboard, shown at the right of Fig. 6, to the three control conductors 420, 421 and 422. Relay 604 also establishes a circuit from battery through the right contact of relay 603, resistance 608, outer left front contact of relay 604 to ground. This circuit shunts the current away from lamp 607 and causes the same to become extinguished which serves as an indication to the operator that a sender has been selected and is now in condition to receive the record of the called subscriber's line.

The operation of relay 408, which causes the movement of the sender selector switch 400, also serves to initiate the movement of a trunk selector switch for the purpose of selecting an idle trunk leading to the mechanical office 122. It will be observed that all three switches, namely the operator's position selector, the sender selector, and the trunk selector are operated simultaneously. Assume that all trunk selector switches 300, 200, etc. are in their normal positions at the time the switching unit is taken for use. Accordingly, the side switch 210 will be standing with its brushes 222, 223, 224, 225, 226 and 227 upon the No. 3 terminals of the corresponding banks. Positions 3 to 10, inclusive, of the side switch represent, respectively, the eight trunk selector switches in order. Terminals 11 to 18 also represent, respectively, the series of eight trunk selector switches and accordingly these terminals are multipled to terminals 3 to 10, as shown in the drawing. In this manner the side switch controls in a single revolution two successive operations of the entire series of eight trunk selector switches. With the first trunk selector 300 in its normal position and with the side switch 210 in position 3, the operation of relay 408 causes the closure of a circuit from battery through the winding of stepping magnet 301, inner contact of said magnet, conductor 216, No. 3 terminal 228, brush 223 of the side switch, conductor 320 outer right contact of relay 408, right back contact of relay 311, conductor 321, brush 224 and its No. 3 terminal, conductor 218, test brush 303 and its No. 21 terminal to ground. A parallel branch of this circuit leads through the winding of relay 311, conductor 425, to ground at the inner left contact of relay 408. Relay 311, however, does not operate so long as its winding is shunted by the direct path to ground at the test brush 303. The stepping magnet 301 interrupts its own circuit and advances the brushes of the switch 300 to their No. 0 position terminals, which represent the first trunk in the first group of twenty. If the first trunk is busy a ground potential will exist upon the No. 0 test terminal and the stepping magnet 301 is again energized. Assume that all trunks of the first group of twenty are busy. This being the case the brushes of the selector switch 300 are stepped around until they reach their No. 20 terminals. When these terminals are reached a circuit is closed from battery through the winding of stepping magnet 301, conductor 214, brush 222, conductor 319, the No. 20 terminal 328, brush 306, conductor 327, next to the inner contact of relay 528 to ground. Magnet 301 becomes energized and remains energized in this closed circuit. On attracting its outer armature the magnet 301 establishes a circuit from battery through the winding and contact of magnet 221, brush 225 and its No. 3 terminal, conductor 220, outer contact of magnet 301, conductor 212, brush 307, conductor 326, innermost back contact of relay 528 to ground. Magnet 221 becomes energized and interrupts its own circuit and advances the brushes 222, 223, 224, 225, etc. of the side switch 210 from their No. 3 to their No. 4 terminals, in which position they are shown in the drawing. As brush 222 disengages its No. 3 terminal the above traced circuit of magnet 301 is opened and this magnet becomes deenergized to advance the brushes of the first selector switch 300 to their No. 21 terminals, or to their normal position.

Immediately that brush 224 encounters its No. 4 terminal a circuit is completed from battery through the winding and inner contact of stepping magnet 201, conductor 215, brush 223, and thence, as previously traced, through the right back contact of relay 311, conductor 321, brush 224, conductor 217, brush 203 and its No. 21 terminal 229, to ground. Magnet 201 interrupts its own circuit and advances the brushes of the selector switch 200 on to their No. 0 terminals, testing the condition of the first of the second group of twenty trunks. Assuming that all trunks preceding the trunk No. 31 are busy therefore, the magnet 201 continues to advance the brushes until they reach the terminals of this idle trunk at which time no ground potential is found on the terminal engaged by test brush 203. Due to the absence of ground potential on the test terminal, the stepping circuit for the magnet 201 is opened and the switch comes to rest.

Moreover, the shunt around the winding of relay 311 is removed and this relay now operates in series with stepping magnet 201. The resistance of relay 311 is sufficiently high to prevent the energization of stepping magnet 201.

The relay 311 completes a circuit from ground through its right front contact, conductor 321, brush 224, conductor 217, brush 203, and thence to the multiple terminals of the selected trunk in all other trunk selector switches. In this manner the outgoing trunk 126, 127, which has just been selected by the selector switch 200, is rendered non-available to any other switch. Relay 311, furthermore, completes a circuit from ground through its outer left contact, conductor 329, inner right contact of relay 527, winding of relay 528 to battery. Relay 528, the circuit of which it is to be noted depends upon the fact that the operator's position selector has found the position and the trunk selector has found an idle trunk, serves to extend certain control conductors through from the trunk selector switches to the indicating equipment at the operator's position. Relay 528 completes a circuit from ground through its innermost front contact, conductor 426, right contact of relay 415, normal contacts at the inner left armature of relay 310, and winding of said relay to battery. Relay 310 operates and locks in a circuit from battery through its inner left front contact, conductor 534, inner left contact of relay 408 to ground.

*Operation of trunk indicating mechanism.*

The complete switching unit has thus been operated and an idle trunk is selected, an idle register has been chosen and associated with such trunk and also associated with the particular operator's position on which the movement of the switching unit was initiated. The next operation to be described is the indication on the lamps at the operator's position of the identity of the trunk that has been chosen in order that the operator may complete the connection of the called line over this trunk. Upon the operation of relay 528 a circuit was closed from ground through the right-hand high resistance winding of relay 312, brush 227 and its No. 4 terminal, conductor 323, inner left back contact of relay 314, conductor 325, next to the outermost contact of relay 528, brush 503, conductor 701, right back contact of relay 702, left-hand winding of sensitive relay 704, left-hand winding of marginal relay 706 to battery. Relay 704 operates but due to the high resistance of the right-hand winding of relay 312 the marginal relay 706 remains inert. Relay 704 locks in a circuit from battery through its right-hand winding and right contact, conductor 720, inner left front contact of relay 603 to ground. At the same time a circuit is closed from ground through the left-hand low resistance winding of relay 312, brush 226 and its No. 4 terminal, conductor 322, outer left back contact of relay 314, conductor 324, outermost contact of relay 528, brush 502, conductor 700, inner left back contact of relay 702, left-hand winding of sensitive relay 703, left-hand winding of marginal relay 705, conductor 722, right contact of relay 603 to battery. Due to the low resistance of the left-hand winding of relay 312 both the sensitive relay 703 and the marginal relay 705 are energized. Relay 703 locks in a circuit from battery through its right-hand winding and inner right contact to the grounded conductor 720, while relay 705 locks in a circuit from battery through its right-hand winding and inner right contact, conductor 723 to ground at the outer left contact of relay 603. The relay 312 becomes energized in the circuit traced and completes an obvious circuit for the relay 313. Relay 313, on operating, closes a holding circuit from battery through its winding and right contact, conductor 330, conductor 426 to ground at the innermost front contact of relay 528. Upon the energization of either of the relays 703 and 704 a circuit is closed over the inner left contact of one of the other of these relays through the winding of relay 703 to battery. It may be observed that either relay 703 or relay 704, or both, will be operated for every position that the side switch 210 may take. In other words, regardless of the group of twenty trunks in which the idle trunk is selected, the combination of the marginal and sensitive relays operated due to the position of the side switch will always include one or the other or both of the relays 703 and 704. Consequently, relay 702 is always operated. This relay is constructed so as to be slow in attracting its armatures and also slow-to-release. As soon as relay 702 becomes energized it opens the circuit of relay 312 and this latter relay releases and closes a circuit from ground through its back contact, left contact of relay 313, winding of relay 314 to battery. Relay 314 operates and disconnects the control conductors 324 and 325 from the conductors 322 and 323 leading to the side switch and connects them instead to the conductors 326 and 327, which extend in multiple to the corresponding brushes of the trunk selector switches.

A circuit is now established from ground through the left-hand winding of marginal relay 714, left-hand winding of sensitive relay 715, inner right back contact of relay 719, inner left front contact of relay 702, conductor 700, and thence, as traced, to conductor 324, outer left front contact of relay 314, conductor 327, conductor 317, brush 206, terminal 230, conductor 316, conductors 331 and 332, right contact of relay 314, inner left contact of relay 311, conductor 531, outer left contact of relay 527 to battery. Since the circuit traced includes no high resistance, both relay 715 and marginal relay 714 are energized. These relays lock in circuits through their right-hand windings to the conductors 720 and 723, respectively. Furthermore, a circuit is closed from ground through the left-hand winding of sensitive relay 716, left back contact of relay 719, right front contact of relay 702, conductor 701, thence through the conductor 325, inner left front contact of relay 314, conductor 326, conductor 318, brush 207, terminal 231, conductor 315, left-hand low resistance winding of relay 308, normal left contact of relay 309, conductor 332, right contact of relay 314, inner left contact of relay 311, thence over conductor 531 to battery. Relay 716 operates and locks through its right-hand winding to the grounded conductor 720. Relay 308 also operates in this circuit and closes a circuit from battery through the outer left contact of relay 527, conductor 531, inner left contact of relay 311, right contact of relay 314, conductor 332, normal left contacts of relay 309, left contact of relay 308, winding of relay 309, conductor 330, conductor 426 to ground. Relay 309 attracts its armatures and closes a locking circuit for itself through its left armature and make-before-break contact, independent of the left armature and contact of relay 308. Relay 308 remains energized, temporarily, over a modified circuit which leads from ground, as above traced, over conductor 315, left winding of relay 308, left contact of said relay, left armature and front contact of relay 309, and thence to battery over conductor 332.

Immediately that one or the other of the two relays 715 and 716 is operated, an obvious circuit is established for the energization of relay 717. Relay 717, upon operating, closes a circuit for relay 718 and this latter relay, in turn, closes a circuit from battery through the winding of relay 719, contact of relay 718, and thence to ground at the inner left contact of either relays 715 or 716. Relay 719, upon operating, opens the circuit of relay 308 permitting the same to release its armatures. A circuit is then closed from ground through the right contact of relay 309, right contact of relay 308, conductor 326, inner left front contact of relay 314, conductor 325, next to the outermost contact of relay 528, brush 503, conductor 701, right front contact of relay 702, left front contact of relay 719, through the windings of relays 708 and 709 in parallel, to battery. Relays 708 and 709 become energized in this circuit.

With the lamp controlling relays operated in the combination above described, the proper lamps are selected and illuminated for indicating the identity of the selected trunk 126, 127 to the operator. Since the number of the selected trunk is 31, it is necessary to illuminate the No. 3 tens lamp 710 and the No. 1 units lamp 711. The circuit for lamp 710 may be traced from battery through the right front contact of relay 709, filament of lamp 710, outer left contact of relay 705, outer left front contact of relay 704, outer right contact of relay 719 to ground. The circuit for lamp 711 may be followed from battery through the inner left contact of relay 713, filament of lamp 711, outer left contact of relay 714, outer left front contact of relay 716 to ground at the outer right contact of relay 719. The operator, observing the number 31 displayed on the indicating lamps, knows that trunk No. 31 is to be used in the extension of the call and thereupon proceeds to insert the plug 118 of her cord circuit into the jack 119 of this trunk. The insertion of the plug in the jack completes a circuit from battery through the lamp 114, resistance 116, sleeve of plug 118, sleeve of jack 119, winding of relay 120 to ground. Lamp 114 is illuminated and the relay 120 attracts its armatures in this circuit. Relay 120 completes a circuit from ground through its outer contact, conductor 130 to the multiple test terminals of all trunk selector switches with which brushes, similar to brush 203, cooperate to hold the trunk non-selectable after the relay 311 has become deenergized and removed the temporary busy ground connection, previously described. Moreover, relay 120 closes a circuit from battery through the right-hand winding of relay 121, inner contact of relay 120, conductor 131, brush 202, conductor 208, innermost right contact of relay 310, winding of relay 410 to ground. Relay 410 operates in this circuit but due to its comparatively high resistance, the relay 121 at the trunk circuit does not act. Relay 410, at its outer contact, opens one branch of the circuit which is maintaining the energization of relay 519. Relay 519, which controls the release of the position selector switch, does not release, however, since it is maintained energized over a second path which may be traced by way of conductor 530, left contact of relay 417, and thence over conductor 423 to ground.

*Positioning of the register sender from operator's keyboard.*

As soon as the operator observes the extinguishment of sender lamp 607 she proceeds to depress the non-locking keys at her position representing the number of the called subscriber's line which was communicated to her by the calling party. Assuming the called number to be 1647, the operator actuates the No. 1 key 615, the No. 6 key 616, the No. 4 key 617, and the No. 7 key 618 in succession. The depression of key 615 completes a circuit from ground over the inner left contact of relay 603, conductor 720, resistance 619, right contact of key 615, inner left front contact of relay 604, brush 505, middle contact of relay 529, conductor 421, brush 405, conductor 915, brush 912 and its normal position terminal, conductor 916, left-hand winding of relay 1002, left-hand winding of relay 1003, conductor 1013 to battery at the middle left contact of relay 903. Relay 1002 operates in this circuit but due to the inclusion of resistance 619 the marginal relay 1003 remains inert. Relay 1002 locks in a circuit from ground through its inner right contact and right-hand winding to battery on conductor 1013. Another circuit is completed from ground on conductor 720, the left contact of key 615, outer right front contact of relay 604, brush 504, outermost right contact of relay 529, conductor 420, brush 404, winding of relay 904, brush 910 and its normal position terminal, conductor 917, right-hand winding of relay 1001 to battery on conductor 1013. Since no resistance is included in this circuit the marginal register relay 1001 operates and locks through its inner left contact and left winding. Relay 1000 is also energized in a circuit from battery on conductor 1013, right-hand winding of relay 1000, inner right contact of relay 1001, inner right contact of relay 1002 to ground. Relay 904, which also becomes energized, completes a circuit from ground through its front contact, left back contact of relay 907, right back contact of relay 900, contact and winding of stepping magnet 908 to battery. Relay 906, which is energized in parallel with the stepping magnet, closes a locking circuit for itself including the contact of magnet 908 and also closes a holding circuit for magnet 908 independent of the contact of relay 904. The magnet 908 becomes energized and when its armature is fully attracted the circuit of relay 906 is opened and this relay becomes deenergized to in turn open the circuit of magnet 908. Magnet 908 releases and advances the brushes of the register control switch forward one step to their No. 1 terminals.

Immediately that the register control switch reaches position 1 a circuit is closed from battery through the winding of relay 1103, left back contact of relay 1102, conductor 1116, brush 909 to ground. Relay 1103 operates and closes a circuit from ground through its inner left contact, conductor 1117, and thence in parallel through the resistance 902 and the winding of relay 901 to battery. This circuit holds the relay 901 energized and shunts the relay 414, which up to this time has been energized in series with relay 901 and resistance 902. Relay 414, on being shunted, releases its armature and removes the shunt from around the winding of relay 416. Relay 416, therefore, energizes in series with the relay 415.

When the operator depresses No. 6 key 616 a circuit is closed from ground over conductor 720, resistance 619, right contacts of key 616, inner left front contact of relay 604, thence, as above traced, over conductor 421 to conductor 915, brush 912 and its first position terminal, conductor 918, left winding of relay 1005, left-hand winding of relay 1006 to battery on conductor 1013. Relay 1005 operates and locks through its right-hand winding but the relay 1006, being marginal, remains inactive. Another circuit is closed from ground over conductor 720, left-hand contact of key 616, inner right front contact of relay 604, thence over conductor 422, brush 406, winding of relay 905, brush 910, conductor 919, right-hand winding of relay 1004 to battery on conductor 1013. Relay 1004 operates and locks through its inner left contact. Relay 905 also energizes and causes the advance of the register control switch in the manner above described from position No. 1 to position No. 2. Relay 905, in addition, closes a circuit from ground through its contact, back contact of relay 904, brush 914, conductor 920, right-hand winding of relay 1007 to battery on conductor 1013. Relay 1007 operates and locks through its left-hand winding and left contact.

Upon the depression of key 617 a circuit is closed from ground over conductor 720, right contact of said key, thence over conductor 421, as above traced, conductor 915, brush 912, terminal No. 2, conductor 921, left-hand winding of relay 1014, left-hand winding of relay 1009, conductor 1015, innermost left contact of relay 903 to battery. Relays 1014 and 1009 operate and lock through their right-hand windings. Another circuit is closed from ground over conductor 720, resistance 626, left-hand contacts of key 617, thence, as above traced, over conductor 420, winding of relay 904, brush 910, conductor 922, right-hand winding of relay 1008, conductor 1013 to battery. Relay 904 operates but relay 1008, being marginal, remains inactive. In the manner above explained the relay 904 causes the advance of the register control switch to its No. 3 position. Lastly, upon the actuation of key 618 a circuit is established from ground over conductor 720, the left contacts of said key, thence over conductor 422 to the winding of relay 905, brush 910, conductor 923, right-hand winding of relay 1010, conductor 1015 to battery. Relay 1010 operates and locks through its left-hand winding. Relay 905 operates and closes a circuit through its contact and the back contact of relay 904, brush 914, conductor 924, right-hand winding of relay 1012, conductor 1015 to battery. Relay 1012 operates and locks through its left-hand winding and left contact. Relay 905 also causes the advance of the register control switch from position 3 to position 4.

As the brush 909 of the control switch leaves its No. 3 terminal the previously traced circuit of relay 1103 is opened and this relay deenergizes to remove the shunt from around the winding of relay 414. Relay 414 again attracts its armature and a circuit is closed from ground through the contact of this relay, outer right front contact of relay 416, winding of relay 417 to battery. Relay 417 operates and closes a circuit from battery through its winding and the winding of relay 418, left front contact of relay 417 to ground at the inner left contact of relay 418. Relay 418, however, cannot operate at this time since it is shunted out by the direct circuit to ground at the contact of relay 414. As will be explained hereinafter, it is at this instant when the relay 417 becomes energized, following the completion of the registration, that the operator's position selector is released.

*Operation of selector switches in the distant mechanical office.*

At the time relay 1103 operates following the registration of the first digit, a circuit is closed from battery through stepping magnet 1113 of the sender control switch, back contact of said magnet, outer left contact of relay 1103, the normal position terminal of brush 1109 to ground. Magnet 1113 interrupts its own circuit and advances the brushes of the sender control switch to their zero position terminals. In this position the fundamental circuit for controlling brush selection of the incoming selector 123 in the distant mechanical office is closed. The fundamental circuit, which is well-known in systems of this character, may be traced from the incoming selector over the trunk conductor 126, conductor 128, brush 204, conductor 209, middle right contact of relay 310, brush 403, conductor 925, brush 1107 and its zero position terminal, winding of stepping relay 1100, left-hand winding of overflow relay 1106, left contact of counting relay 1115, conductor 1118, brush 402, outermost right contact of relay 310, conductor 211, brush 205, conductor 129, trunk conductor 128, and thence to the opposite pole of battery at the incoming selector switch 123. Due to the direction of flow of current, the overflow relay 1106, which is polarized, does not operate in the fundamental circuit. The stepping relay 1100, however, attracts its armature and closes a circuit through its contact, brush 1108, conductor 1119, right back contact of relay 1015, outer right front contact of relay 1000, left back contact of relay 1003, conductor 1016, thence to the corresponding conductor 1120, Fig. 11, conductor 1121, brush 1112, conductor 1122, winding of zero counting relay 1114 to battery. Relay 1114 operates and closes a circuit from battery through its winding and the winding of relay 1115 in series, contact of relay 1114, conductor 1123, brush 1110 to ground. In the well-known manner, the first shunt of the stepping relay 1100, by the actuation of the incoming switch 123, permits the energization of relay 1115 to open the fundamental circuit and also to close a circuit from battery through the winding and contact of stepping magnet 1113, inner right back contact of relay 1105, right contact of relay 1115, conductor 1123 to ground. Magnet 1113 operates to advance the brushes of the sender switch to their No. 1 position terminals and the counting relays become deenergized. In position No. 1 a circuit is closed from battery through the winding and contact of magnet 1113, outer contact of relay 1104, brush 1110 to ground. Magnet 1113 operates and advances the sender switch into position No. 2.

In position No. 2 the fundamental circuit is again closed and group selection takes place at the incoming switch 123 in accordance with the energized condition of the register relays. At the end of group selection the O' counting relay 1115 opens the fundamental circuit and at its right contact opens the circuit above traced for moving the sender control switch out of position 2 and into position 3 from whence it is driven into position 4.

Following trunk hunting at the incoming switch the fundamental circuit is again established for brush selection at the final selector switch 124. Stepping relay 1100 is successively shunted and the counting relays operate in accordance with the energized condition of the register relays until the proper set of brushes have been reached, at which time the fundamental circuit is opened by the O' counting relay and a circuit is closed as explained for driving the sender control switch out of position 4 and into position 5 from whence it is immediately driven into position 6.

In positions 6 and 8 tens and units selection takes place at the final switch in the manner well understood and the sender control switch finally advances into position 9.

*Release of register sender.*

Following the selective operation at the mechanical office current over the fundamental circuit is reversed from the incoming switch in any well-known manner thereby causing the operation of the overflow relay 1106. Relay 1106, upon operating, locks in a circuit from battery through its righthand winding and contact, brush 1109 to ground. Moreover, relay 1106 closes a circuit from battery, through the winding of relay 1105, contact of relay 1106, and thence to ground at brush 1109. Relay 1105 completes a circuit from battery through the windings of relays 1114 and 1115 in series, front contact and outer left armature of relay 1105 to ground at brush 1109. A circuit is thereupon established from battery through the winding of relay 1102, inner right front contact of relay 1105, right contact of relay 1115, left contact of relay 1114, front contact and outer left armature of relay 1105, brush 1109 to ground. Relay 1102 closes a circuit from battery through its right contact, conductor 1124, right-hand winding of relay 907 to ground. Relay 907 becomes energized and locks in a circuit from ground through its right-hand winding and inner right contact to battery through the innermost left contact of relay 903. Relay 907 establishes a circuit from battery through the winding and contact of magnet 908, right back contact of relay 900, left front contact of relay 907, conductor 1116, left front contact of relay 1102, right contact of relay 1103, conductor 1125, brush 909 and its No. 4 terminal, to ground. Magnet 908 operates to advance the register control switch to its No. 5 position terminals. In position No. 5 of the register control switch a circuit is closed from battery through the right-hand winding of relay 900, brush 909 to ground. Relay 900 operates and opens the circuit of relay 901 which deenergizes and, in turn, permits the release of relay 903. Before relay 900 can release relay 903 becomes deenergized and a holding circuit is now closed for relay 900 through its lefthand winding, outermost left contact of relay 903, conductor 927, brush 1109 to ground.

Relay 900, in its energized condition, closes a circuit from battery through the winding and contact of magnet 908, right front contact of relay 900, inner right contact of relay 903, brush 913 to ground. Magnet 908 interrupts its own circuit and advances the brushes of the register control switch from position 5 into position 7 where the operating circuit is open and the switch comes to rest. Position 7 is one of the normal positions of the register control switch. With relay 900 operated a circuit is also closed from battery through the winding and contact of magnet 1113, conductor 926, inner left contact of relay 900, outermost left contact of relay 903, conductor 927, to ground at the brush 1109. Magnet 1113 interrupts its own circuit and advances the brushes of the sender control switch into their normal position, position 10.

Relays 1106, 1105, 1102 and the counting relays 1114 and 1115 all become deenergized at the time the brush 1109 moves into position 10. Furthermore, the register relays shown in Fig. 10, which have been held locked, are released upon the deenergization of relay 903 and the removal of battery potential from conductors 1015 and 1013.

*Release of the operator's position selector switch.*

As hereinbefore explained, the relay 417 is energized at the time the operator has completed the setting up of the called subscriber's number on the registers of the sender. Since the operator has been advised by the indicating lamps of the number of the trunk selected and since she has completed the registration of the called line on the sender, the equipment at her position is no longer required in connection with the present call. It will be remembered that the energization of relay 410, which occurred upon the insertion of the plug 118 in the jack 119 of the trunk selected, opened one branch of the holding circuit of relay 519. The operation of relay 417, which now occurs at the time the registration of the called number has been completed, opens the remaining branch of the holding circuit and relay 519 becomes deenergized. Relay 519, at its outer right contact, opens the holding circuit of relays 612, 603, 602 and 524 permitting these relays to become deenergized. Relay 524 breaks the circuit of relay 526 which releases its armatures and opens the circuit of relay 527. Relay 527 deenergizes and in turn opens the circuit of relay 528. Relay 528 permits the deenergization of relay 1009.

Relay 603 opens the circuits of relays 611, 609 and of all energized sensitive and marginal relays shown in Fig. 7. Relay 602 completes a circuit from ground through its normal right-hand contact, conductor 632, brush 501, front contacts at the inner right armature of relay 508, outer left contact of relay 519, left-hand winding of relay 522 to battery. Relay 522 becomes energized and closes a circuit from battery through the winding of stepping magnet 507, contact of said magnet, inner right front contact of relay 508, right contact of relay 523, left contacts of relays 522, contact of relay 521 to ground. Magnet 507 interrupts its own circuit and advances the brushes of the position selector 500 from terminal to terminal. The relay 522 is maintained energized in each position of the switch 500 by ground potential on the terminal with which brush 501 cooperates extended from the normal right-hand contact at relays, similar to 602, 622 and 628, at non-calling operators' positions. When the switch 500 reaches the next to its normal position a circuit is closed from battery through the right-hand winding of relay 522, right front contact of said relay, front contacts at the inner right armature of relay 508, brush 501, conductor 540, winding of relay 521 to ground. Relay 521 opens the holding circuit of relay 508, which relay becomes deenergized and opens the circuit of relay 520. Relay 508, on deenergizing, completes a circuit from battery through the winding and contact of magnet 507, inner right back contact of relay 508, brush 501, conductor 540, outer right back contact of relay 520 to ground. Stepping magnet 507 interrupts its own circuit once more and advances the brushes of the switch 500 to their normal position terminal. The relay 523 deenergizes and relay 522 releases its armatures. The position selector switch and all equipment at the operator's position 610 has thus been restored to its normal condition.

*Release of the switching unit.*

At the time the relay 900 becomes energized to cause the release of the register sender it opens the previously traced circuit for relay 414. Relay 414 removes the shunt from around the winding of relay 418 and this latter relay operates in series with relay 417. The circuit hereinbefore traced through the winding of relay 121 and high resistance relay 410 is now so multipled as to lead over the left back contact of relay 411, left-hand low resistance winding of relay 409, left contact of relay 418 to ground. Relay 409 operates and due to the comparatively low resistance of this path, relay 121, at the trunk circuit, also energizes. Relay 409, at its right contact, opens the holding circuit of relay 408 which becomes deenergized. Relay 408, upon releasing, opens the circuits of relays 400, 413, 415, 416, 417, 418, 310 and 311.

Relay 121, on energizing, closes a holding circuit for itself from battery through its right-hand winding and contact, thence through its left-hand non-inductive winding, to ground at the outer contact of relay 120. Relay 121, at its left contact, extends the talking conductors of the operator's cord circuit through to the trunk conductors 126, 127 leading to the mechanical office 122. When the called subscriber answers, relay 111 is operated in the well-known manner to extinguish the supervisory lamp 114. At the end of conversation the operator receives the usual supervisory signals and the connection is disestablished by removing the plugs of her cord circuit from the jacks 101 and 119.

*Allotment of an idle switching unit.*

Consideration will next be given to the manner in which the switching units are allotted for use. Following the unbalancing of coil 812 it will be recalled the relay 809 was operated and a circuit closed for relay 508 to start the operator's position selector 500 in motion. Relay 508, on energizing, closes a circuit from battery through the outer left contact of relay 310, conductor 533, inner left contact of relay 527, conductor 532, outer left contact of relay 508, conductor 819 to a point between the upper winding of the balancing coil and the polarized relay 814. Current flowing over this circuit is in such a direction as to cause the polarized relay 814 to restore its armature, opening the circuit of relay 809. Current is removed from the balancing coil by the energization of relay 612 and the energization of relay 527, which occur in the manner hereinbefore described.

At the time relay 520 is operated the following circuit is closed: ground, through the inner right front contact of relay 520, conductor 816, brush 802 of the allotter switch 800, thence in parallel to the winding of relay 808 and the contact and winding of relay 801 to battery. Relay 808 attracts its armature and removes ground from conductor 824 so that the energization of any relay, such as relays 809, 810, etc., will be without effect to cause the energization of one of the relays 508, 518, etc. until a new switching unit has been allotted. Stepping magnet 801 interrupts its own circuit and advances the allotter switch 800 from position to position until the test brush 802 encounters a terminal identifying an idle switching unit. When an idle unit is found the allotter switch ceases to rotate and relay 808 becomes deenergized.

What is claimed is:

1. In a telephone system, a plurality of operators' positions, a group of trunks, a trunk selector switch, a plurality of position selector switches, each serving a different group of said positions, means for operating the trunk selector to select one of said trunks, means for operating the position selector serving the group containing a particular operator's position, and means at such position for indicating the identity of the trunk selected.

2. In a telephone system, a plurality of operators' positions, a group of trunks, a trunk selector switch, a plurality of position selector switches, each serving a different group of said positions, means for operating the trunk selector to select one of said trunks, means for selecting the position selector switch serving a given group of positions and for operating the same to select a particular position therein, and means at such position for indicating the identity of the selected trunk.

3. In a telephone system, a plurality of operators' positions, a group of trunks, a trunk selector switch, a plurality of position selector switches, each serving a different group of said positions, means for operating a trunk selector to select one of said trunks, means for selecting the position selector switch serving a given group of positions and for operating the same simultaneously with the operation of said trunk selector to select a particular position therein, and means at such position operated to indicate the identity of the selected trunk.

4. In a telephone system, a plurality of operators' positions, a group of trunks, a trunk selector switch, a plurality of position selector switches, each serving a different group of said positions, means for operating the trunk selector to select one of said trunks, means for selecting the position selector switch serving a given group of positions and for operating the same to select a particular position therein, and a set of indicating lamps at such position for indicating the designation of the selected trunk.

5. In a telephone system, a subscriber's line, a plurality of operators' positions, a group of trunks, a trunk selector switch, a plurality of position selector switches, each serving a different group of said positions, means for operating the trunk selector to select one of said trunks, means for selecting the position selector switch serving a given group of positions and for operating the same to select a particular position therein, means at said particular position for indicating to the operator the identity of the selected trunk, and means at the operator's position for connecting the subscriber's line to the selected trunk.

6. In a telephone system, a plurality of operators' positions arranged in groups, a group of trunks, automatic switches in which said trunks terminate, a plurality of controlling senders, a trunk selector switch, a sender selector switch, a plurality of position selector switches, each serving a different group of said positions, means for operating the trunk selector to select one of said trunks, means for operating the sender selector to select one of said senders, means for operating the position selector serving a particular position to select such position, means operated at said position for identifying the selected trunk, and means controlled over such trunk by the selected sender for operating said automatic switches.

7. In a telephone system, a plurality of operators' positions, a group of trunks, a trunk selector switch, a plurality of position selector switches, each serving a different group of said positions, means controlled by any operator for initiating the movement of said trunk selector and of the position selector serving the position of the particular operator who initiated the movement, said trunk selector operating to select one of said trunks and said position selector operating to select said particular operator's position, and means at such position for identifying the selected trunk.

8. In a telephone system, a plurality of operators' positions, a group of trunks, a trunk selector switch, a plurality of position selector switches, each serving a different group of said positions, a key at each operator's position, means controlled by the actuation of the key at any operator's position for initiating the movement of said trunk selector and of the position selector serving the position of the particular operator who actuated her key, said trunk selector operating to select one of said trunks and said position selector operating to select said particular operator's position, and means at such position for identifying the selected trunk.

9. In a telephone system, a plurality of operators' positions, a group of trunks, a plurality of switching units each including a trunk selector switch and a plurality of position selector switches, each position selector of each unit serving a different group of said positions, means for operating any one of said switching units, the trunk selector of the operated unit acting to select an idle trunk and the position selector of such unit which serves a particular position acting to select such position, and means at said position for identifying the selected idle trunk.

10. In a telephone system, a plurality of operators' positions, a group of trunks, a plurality of switching units each including a trunk selector switch and a plurality of position selector switches, each position selector of each unit serving a different group of said positions, means for allotting one of said units for use, means for operating the allotted unit, the trunk selector of the operated unit acting to select an idle trunk and the position selector of such unit which serves a particular position acting to select such position, and means at said particular position for identifying the selected idle trunk.

11. In a telephone system, a plurality of operators' positions, a group of trunks, a plurality of switching units each including a trunk selector switch and a plurality of position selector switches, each position selector of each unit serving a different group of said positions, means for allotting one of said units for use, means controlled by any operator for initiating the movement of the allotted switching unit, the trunk selector of such unit acting to select an idle trunk and the particular position selector of such unit which serves the position of the operator who initiated the movement thereof acting to select that position, and means at said position for identifying the selected idle trunk.

12. In a telephone system, a plurality of operators' positions, a group of trunks, a plurality of controlling senders, a plurality of switching units each including a trunk selector switch, a sender selector switch and a plurality of operators' position selector switches, each position selector of each unit serving a different group of said positions, means for operating any one of said switching units, the trunk selector of the operated unit acting to select an idle trunk, the sender selector of such unit acting to select an idle sender and the position selector of such unit which serves a particular operator's position acting to select such position, means at said position for identifying the selected trunk, and means at said position for setting the selected sender.

13. In a telephone system, a plurality of operators' positions, a group of trunks, a trunk selector switch, a plurality of position selector switches, each serving a different group of said positions, means for operating the trunk selector to select one of said trunks, means for operating only the particular position selector which serves the group containing a certain operator's position, and means at such position for indicating the identity of the trunk selected.

14. In a telephone system, a plurality of operators' positions, a group of trunks, a trunk selector switch, a plurality of position selector switches, each serving a different group of said positions, means controlled by any operator for causing the operation of the trunk selector switch to select one of said trunks and for causing the operation of the particular position selector only which serves the group containing said operator's position to select said position, and means at the operator's position for indicating the identity of the selected trunk.

15. In a telephone exchange system employing a switching unit comprising a sender selector for selecting an idle sender, trunk selectors for choosing an idle outgoing trunk and operators' position selectors, the method which comprises dividing the operators' positions into a plurality of groups, and assigning a position selector to each group, whereby when a switching unit is taken for use by an operator only that particular one of the position selectors having access to the operator's position involved is set in operation.

In witness whereof, I hereunto subscribe my name this 20th day of September, A. D., 1921.

LOUIS M. ALLEN.